(12) United States Patent
Steger et al.

(10) Patent No.: US 6,505,247 B1
(45) Date of Patent: Jan. 7, 2003

(54) INDUSTRIAL AUTOMATION SYSTEM AND METHOD FOR EFFICIENTLY TRANSFERRING TIME-SENSITIVE AND QUALITY-SENSITIVE DATA

(75) Inventors: Perry Steger, Georgetown, TX (US); David Pierce, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/243,224

(22) Filed: Feb. 2, 1999

Related U.S. Application Data

(60) Provisional application No. 60/097,447, filed on Aug. 21, 1998.

(51) Int. Cl.[7] .............................................. G06F 15/173
(52) U.S. Cl. ...................... 709/224; 709/203; 709/201; 700/9; 710/1
(58) Field of Search ................................ 709/203, 201, 709/224, 230, 236, 245; 714/4.6; 700/9, 122; 702/122; 710/1, 5

(56) References Cited

U.S. PATENT DOCUMENTS

| | | | | |
|---|---|---|---|---|
| 5,233,618 A | * | 8/1993 | Glider et al. | 714/6 |
| 5,321,816 A | * | 6/1994 | Rogan et al. | 711/163 |
| 5,469,150 A | * | 11/1995 | Sitte | 340/3.1 |
| 5,682,460 A | * | 10/1997 | Hyziak et al. | 707/104.1 |
| 5,768,148 A | * | 6/1998 | Murphy et al. | 345/332 |
| 5,844,794 A | * | 12/1998 | Keeley | 700/7 |
| 5,862,411 A | * | 1/1999 | Kay et al. | 375/354 |
| 5,970,430 A | * | 10/1999 | Burns et al. | 702/122 |
| 6,102,965 A | * | 8/2000 | Dye et al. | 707/10 |
| 6,201,996 B1 | * | 3/2001 | Crater et al. | 700/9 |
| 6,370,569 B1 | * | 4/2002 | Austin | 709/217 |
| 6,411,987 B1 | * | 6/2002 | Steger et al. | 700/9 |

* cited by examiner

*Primary Examiner*—Mehmet B. Geckil
(74) *Attorney, Agent, or Firm*—Jeffrey C. Hood

(57) ABSTRACT

The system and method of industrial automation provides improved network transfer of data between nodes. The system comprises a plurality of computer systems which are interconnected through a network, wherein each of the computer systems executes industrial automation software. One or more of these computer systems interface to various hardware I/O devices for data acquisition. Each computer system is home to one or more client and/or server processes. Before data acquisition begins, every server process registers a plurality of time/quality (TQ) groups, wherein each TQ group is identified by a time/quality identification value (TQID), and wherein each TQ group represents a set of associated data elements. When a hardware I/O device generates data, a server process which is linked to that device through a device driver receives a block of data from the device. The driver assigns to the block a single timestamp and a single quality value. Using a real-time protocol, the server adds one or more blocks of data to a packet and transmits the packet to every client which has subscribed to the data. For increased network and computational efficiency, the real-time protocol includes compression techniques and is exception-based: only changed data elements, changed timestamps, and changed quality values are sent to clients. Both the clients and the server store the TQID for each block, so that the client can more efficiently update the changed timestamps and changed quality values for all data elements in a TQ group.

67 Claims, 6 Drawing Sheets

INDUSTRIAL AUTOMATION SYSTEM AND METHOD FOR EFFICIENTLY TRANSFERRING TIME-SENSITIVE AND QUALITY-SENSITIVE DATA

PRIORITY TO PRIOR PROVISIONAL APPLICATION

This application claims benefit of priority of provisional application Ser. No. 60/097,447 filed Aug. 21, 1998 whose inventors were Perry Steger and David Pierce.

FIELD OF THE INVENTION

The present invention relates to industrial automation software which provides a graphical interface to a process, such as either a human machine interface (HMI) or supervisory control and data acquisition (SCADA) capabilities.

DESCRIPTION OF THE RELATED ART

Industrial automation applications generally perform various functions such as a human machine interface (HMI), data logging, I/O interfacing, advanced control, and enterprise connectivity. Industrial automation applications, also referred to as process monitoring and control applications, cover many applications and industries, including applications in industrial and research environments; continuous, batch and discrete processes; and I/O operations ranging from data collection to SCADA to direct control. Personal computer systems are increasingly being used in industrial automation applications. Reasons for the increasing use of personal computers in industrial automation applications include the open PC architecture, which is both highly flexible and adaptable to many functions; high computational performance at a relatively low cost; a wide variety of off-the-shelf software and hardware products which provide a wide range of data acquisition, analysis, presentation, and management tools; and the relative ease of connecting various computer systems within a system.

PC based systems often either replace or supplement existing systems such as distributed control systems (DCS) or a PLC (programmable logic controller) based system. Where a PC based system supplements an existing control system, the PC based system can serve many different types of auxiliary functions which enhance the use of these systems and provide lower expansion costs. Industrial automation software executing on a personal computer provides an architecture for applications ranging from simple HMI to large sophisticated SCADA systems. This industrial automation software generally supports functions such as PLC interfacing, trending and data logging, among others.

Modern PC based industrial automation software applications generally allow the user to monitor and control the process from any workstation or computer on the network. The industrial automation software generally provides networking capabilities which allows the user to view the same or different screens simultaneously on separate nodes, make set point adjustments and acknowledge alarms from any node, and configure specific nodes for monitoring only, among others.

In prior systems, there have basically been three methods for networking multiple computer nodes. One method for networking multiple computer nodes on a network in an industrial automation system is referred to as multi-link networking. This method requires a net DDE (network dynamic data exchange) link for each and every value being passed between the nodes. Dynamic data exchange (DDE) is a Microsoft application tool that allows the user to connect live data from one Windows application to another. After a DDE link has been established, any data value change in the source application automatically and immediately updates the associated value in the linked application. Once values have been linked, any change to the value of one object is instantly propagated to and reflected by the second object at the other computer. Another type of net DDE networking is referred to as table-to-table networking. This method implements a "data concentrator concept" at each node wherein each node includes one or more concentrators, also referred to as table objects, which are linked between the nodes. The user basically links a table to a corresponding table at another computer using net DDE. Once linked, the tables update each other on any and all changes within their databases. The second type of networking which has traditionally been performed is referred to a hardware networking. In this method, all nodes in the industrial automation system which are desired to be networked are required to have direct communication access to all of the hardware. Thus, in this method, the PLCs, Remote Terminal Units (RTUs), and other I/O are the mechanisms for sharing data between nodes. This method does not rely on data being directly passed between the industrial automation computer systems also referred to as nodes. The third method uses the OPC (OLE for Process Control) Data Access interfaces together with DCOM (Distributed Component Object Model) to make network connections between a server and client. The server exposes an OPC interface that exposes functions to read and write variable values. These functions are marshalled across the network using DCOM so that the client can call them just as if the server were on the same machine as the client. This solution has the advantage of simplicity on the part of person developing the server and client applications. It has the disadvantage that each call into the OPC interface blocks while a message is sent over the network from client to server and a response is sent back. Additionally, there is no mechanism for data compression in the OPC/DCOM protocol.

In a networked industrial automation system including a plurality of nodes, it is highly desirable for data values received from hardware devices, such as PLCs, to be received by each of the clients which desire to monitor or receive the respective data. For example, each computer system or node on the network can act as a client, and each client can subscribe to thousands of data points from various other devices. Accordingly, this large transfer of data can consume a large amount of network bandwidth and thus degrade system operation.

For example, when a hardware device generates data, current industrial automation software assigns a timestamp and quality value to every data element. This results in increased network traffic and storage requirements. Also, data is transferred through the network in packets wherein each packet has associated overhead in terms of headers, footers, error correction information, and other protocol information.

Therefore, an improved networked industrial automation system and method is desired for data transfer among nodes in the network. It would be highly desirable for the system to provide an efficient mechanism for transferring large amounts of data, wherein the system is scalable and hence provides graceful degradation as the number of data points being transmitted increases.

SUMMARY OF THE INVENTION

The present invention comprises a computer based industrial automation system and method which provides improved network transfer of data between different nodes. In the preferred embodiment, the system comprises a plurality of computer systems, referred to as nodes, which are interconnected through a network. One or more of these computer systems interface to various hardware I/O devices in the industrial automation system such as PLCs (programmable logic controllers), etc. Each of the computer systems preferably executes industrial automation software according to the present invention. The industrial automation software provides a graphical interface (GUI) to the process, e.g., as either a human machine interface (HMI) or as a supervisory control and data acquisition (SCADA) system.

In the preferred embodiment, when a hardware I/O device generates data, a server process or object is notified and receives the data from the hardware I/O device. The server process maintains a database of clients which are interested in the data being provided or published by the respective hardware I/O device. In response to receiving the data element from the hardware I/O device, the server creates a packet for the data for transfer over the network to a respective client, or to each of a plurality of clients which are interested in the data. The server preferably uses a novel real-time protocol for creation of the packet and transfer of the packet over the network in substantially real time.

In the preferred embodiment, the server process operates to compress the data using delta compression, wherein a delta value represents the change in the data value of the data element with respect to the prior data element value. The server process then represents this delta data value as an integer value times a quantum value, wherein the quantum value was previously determined or agreed upon between the server and the respective one or more clients. This quantum value is predetermined to enable the server process to optimally represent the delta data value as an integer value and hence preferably within a single byte format.

The server process comprises one or more drivers and one or more real-time servers. In the preferred embodiment, the driver reads a block of data elements from one or more hardware devices. The driver then assigns a single timestamp and a single quality value to the block of data elements. The quality value represents the presence or absence of specified error conditions which affect the quality of the data at the time it is generated by the data acquisition device. The driver provides the block, including the single timestamp and single quality value, to a real-time server. The real-time server then generates a packet comprising one or more blocks received from one or more drivers, wherein each block includes a plurality of data elements, the single timestamp, and the single quality value. The real-time server sends the entire block, including the single timestamp and the single quality value, using delta compression, so that only the changed values and latest timestamps and quality values are sent to clients. By using a single timestamp and single quality value for each block of data elements, the method reduces network traffic and storage requirements.

In the preferred embodiment, for each block that the driver will acquire, the server process has previously registered a time/quality (TQ) group with the real-time protocol on both the client and server ends. A TQ group defines a set of associated data elements which share a timestamp and quality value. A time-quality identification value (TQID) identifies a pre-defined TQ group, and the server process and each of the clients store a TQID for each TQ group. The system and method utilize the TQID to more efficiently update data elements stored by a subscribing client: for each TQ group as identified by a TQID, the server only sends to each subscribing client the changed data elements and the latest timestamp and quality value, and the client updates the appropriate data elements with the latest timestamp and quality value by referring to the TQID for those data elements.

In the preferred embodiment, the server operates to add compressed data element values to a packet for either a predetermined timeout period or until the payload of the packet has reached a certain size. Thus, the system essentially uses a "train station" model, wherein the train does not leave the station (the packet is not transmitted) until the train (packet) is substantially full or a certain time period has elapsed. By maximizing the payload of compressed data values comprised in the packet, the system operates to transfer a large amount of data with respect to each packet, thus reducing the overhead associated with protocol information of respective packets. In other words, the system operates to transfer the largest amount of data possible for each respective packet, thus reducing the overhead associated with each data element value. Once the payload of the packet has reached a certain size and/or a timeout period has elapsed, the server process transfers the packet to each of the one or more clients which are interested in the data. The client then operates to remove the payload of compressed data values from the packet, decompress the data, and perform any desired operations or storage with respect to the received data values.

In one embodiment, the server process determines if a plurality of clients are interested in at least a subset of the same data elements. If so, the server process operates to generate a multi-cast packet which is a packet comprising data element values, preferably in a compressed format, which are desired by each of the plurality of clients. Once this packet is completed, i.e., has reached a certain size and/or a certain time out period has elapsed, the server process operates to multi-cast this packet to each of the plurality of clients which are interested in this common data. This further reduces network traffic by reducing the amount of individual packets which would normally be required to be transmitted in a point-to-point single-cast system.

DETAILED DESCRIPTION OF THE PREFERRED EMBODIMENT

Figure 1:
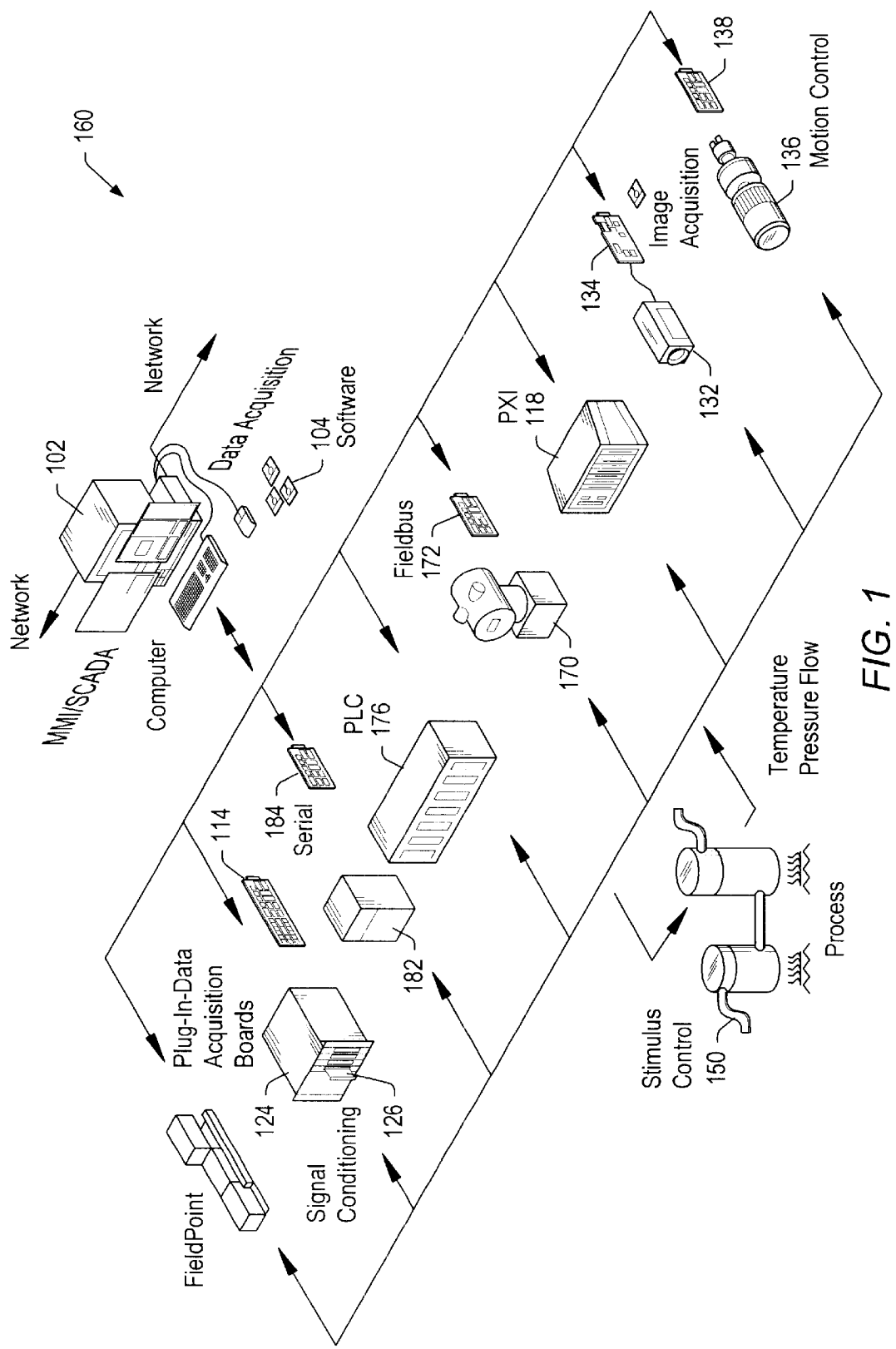
FIG. 1 illustrates an industrial automation system according to one embodiment of the present invention.

FIG. 1—Industrial Automation System

FIG. 1 illustrates an industrial automation system 160. The system 160 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an industrial automation function, such as MMI (Man Machine Interface; also referred to as HMI, or human machine interface), SCADA (Supervisory Control and Data Acquisition), portable or distributed data acquisition, process control, advanced analysis, or other control.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

The video device 132 is coupled to the computer 102 via the image acquisition card 134, and the motion control device 136 is coupled to the computer 102 through the motion control interface card 138. The data acquisition board 114 is coupled to the computer 102, and preferably interfaces through signal conditioning circuitry 124 to the process 150. The signal conditioning circuitry 124 preferably comprises an SCXI (Signal Conditioning extensions for Instrumentation) chassis comprising one or more SCXI modules 126. The PXI chassis or instrument 118 is preferably coupled to the computer 102 through the computer's PCI bus.

The serial instrument 182 is coupled to the computer 102 through a serial interface card 184, or through a serial port, such as an RS-232 port, provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102, such as a PCI bus slot, a PC Card slot, or an ISA, EISA or MicroChannel bus slot provided by the computer 102. However, these cards 114, 184, 172, 134, and 138 are shown external to computer 102 for illustrative purposes.

In typical industrial automation systems a device will not be present of each interface type, and in fact many systems may only have one or more devices of a single interface type, such as only PLCs. The devices are coupled to the device or process 150.

The computer system 102 preferably includes a memory media (or medium) on which computer programs according to the present invention are stored. The term "memory media" is intended to include an installation media, e.g., a CD-ROM, or floppy disks 104, a computer system memory such as DRAM, SRAM, EDO RAM, etc., or a non-volatile memory such as a magnetic media, e.g., a hard drive, or optical storage. The memory media preferably stores a graphical development and control system for industrial automation applications. The industrial automation program is operable to provide improved network transfer of real-time and historical data in the system. The host CPU executing code and data from the memory media thus comprises a means for creating, configuring and controlling an industrial automation system according to the methods described below.

The devices in FIG. 1 are controlled by graphical software programs. In the preferred embodiment, the present invention utilizes the Lookout graphical programming system available from National Instruments.

Although in the preferred embodiment the system is involved with data acquisition/generation, analysis, and/or display, including HMI and SCADA applications, and for controlling or modeling instrumentation or industrial automation hardware, it is noted that the present invention can be used for a plethora of applications and is not limited to instrumentation or industrial automation applications. In other words, FIG. 1 is exemplary only, and the present invention may be used in any of various types of systems.

Figure 2:
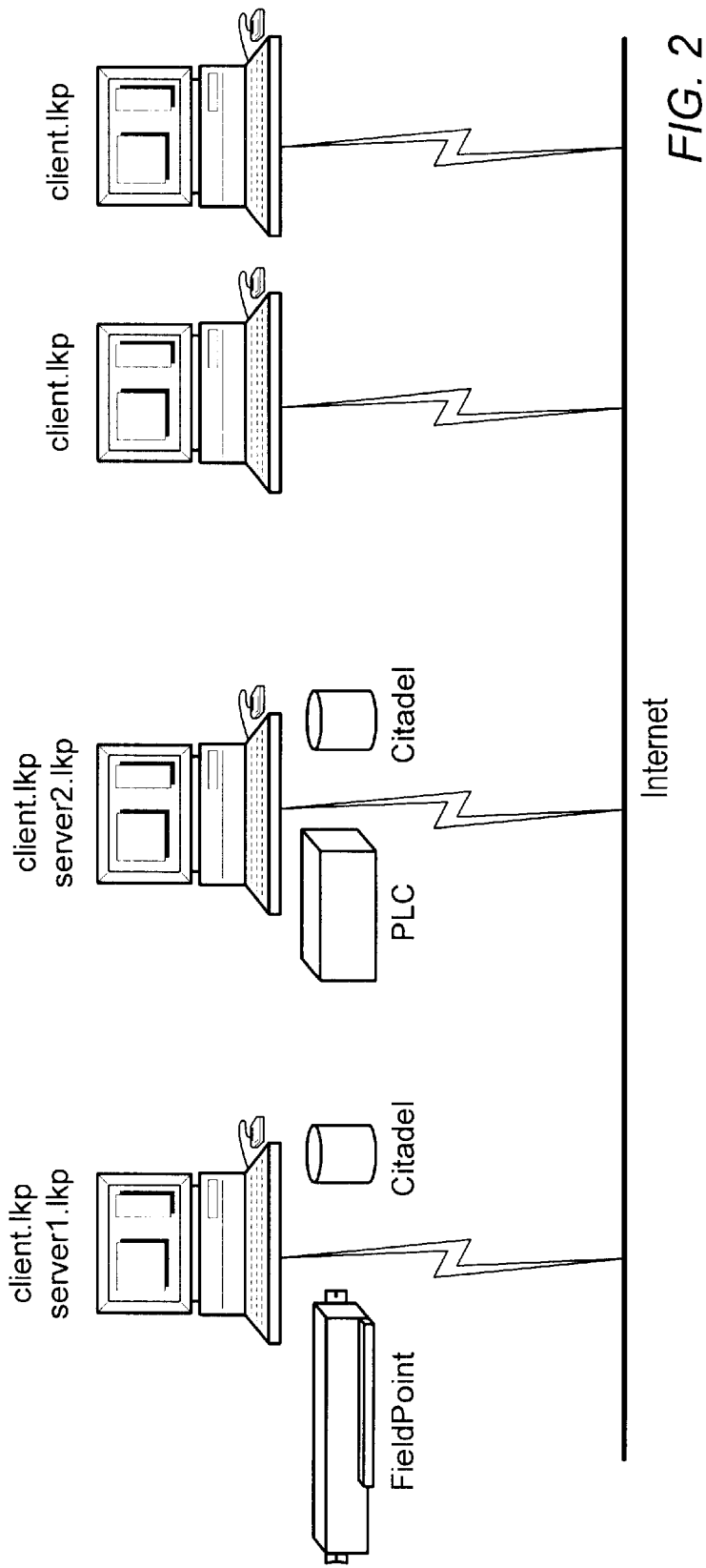
FIG. 2 illustrates a networked computer system in an industrial automation system.

FIG. 2—Networked Industrial Automation System

FIG. 2 illustrates a networked industrial automation system according to one embodiment of the present invention. FIG. 1 illustrates a single computer industrial automation system, whereas FIG. 2 illustrates an industrial automation system including a plurality of connected computer systems. The computer systems are interconnected through a network. The network may be any of various types of local area network (LAN) or wide are network (WAN), including Ethernet or Token Ring LAN networks, and the Internet, among others. As shown, one or more of the computer systems 102 may be configured as a client computer system, and one or more computer systems may be configured as a server computer system. Also, as shown, one or more computer systems may be configured both as client and server computer systems. As discussed with reference to FIG. 1, each computer may be connected to various types of industrial automation devices. For example, one computer may be connected to a FieldPoint distributed data acquisition system whereas a second computer system may be connected to one or more programmable logic controllers (PLCs). As shown, each server computer preferably includes a database for logging data in the industrial automation system. The database is preferably comprised in internal non-volatile memory, or external non-volatile memory.

Each computer preferably executes industrial automation software which is usable to configure the client and/or server operation of each respective computer system in the industrial automation system. In the preferred embodiment, the industrial automation software is the Lookout software available from National Instruments Corporation. In the Lookout system, the database is referred to as the Citadel database. According to the preferred embodiment of the invention, the industrial automation software executing on one or more of the computer systems enables distributed database features, including the distribution of historical data and the distributed handling of alarms and events. The industrial automation software of the present invention further includes improved functionality for transferring real-time data within the industrial automation system.

In developing a Lookout application, the user first creates one or more server process files, which includes configuring hardware, configuring Lookout drivers, and configuring control. The user then creates one or more client process files. The client files may be run or executed on any machine connected to the network, e.g., connected to the Internet. The Lookout industrial automation software further supports multiple process files, which simplifies development of large applications and simplifies development of client/server and multi-client/multi-server applications. By means of multiple process files, the same client file can be used on any machine, and the human machine interface (HMI) is prevented from affecting the control process.

According to the present invention, a server process which receives data from one or more devices operates to efficiently and optimally generate packets of the received data elements for transfer within the networked system. The server process is operable to incorporate data elements into a packet according to a novel packet format and real-time protocol which maximizes the packet data payload and which thus minimizes data transfer requirements. According to the preferred embodiment, the server process operates to store data elements as delta values (delta compression) wherein the delta value comprises the change or delta from a prior data element. In addition, the server process operates to store the delta value in the packet as an integer times a "quantum" value, wherein the quantum value is pre-defined or agreed upon by the respective client and the server for the respective data element or type of data element. This enables the transfer of only integer values across the network. In many instances, the integer can be represented as a single byte, thus reducing network traffic. Thus, the server process operates to compress data prior to storage of the data in the packet.

The server process further implements a real-time data transfer protocol, wherein the server process incorporates the compressed data elements into the packet until a certain threshold or amount of data has been stored in the packet and/or a certain timeout period has elapsed. Thus, the system essentially uses a "train station" model, wherein the "train" does not leave the "station" (the packet is not transmitted) until the "train" (packet) is substantially full or a certain time period has elapsed. By maximizing the payload of compressed data values comprised in the packet, the system operates to transfer a large amount of data with respect to each packet, thus reducing the overhead associated with header and footer information of respective packets. In other words, the system operates to transfer the largest amount of data possible for each respective packet, thus reducing the overhead associated with each data element value. Once the payload of the packet has reached a certain size or a timeout period has elapsed, the server process transfers the packet to each of one or more clients who are interested in the data. The client then operates to remove the payload of compressed data values from the packet, decompress the data, and perform any desired operations or storage with respect to the received data values.

Figure 3:
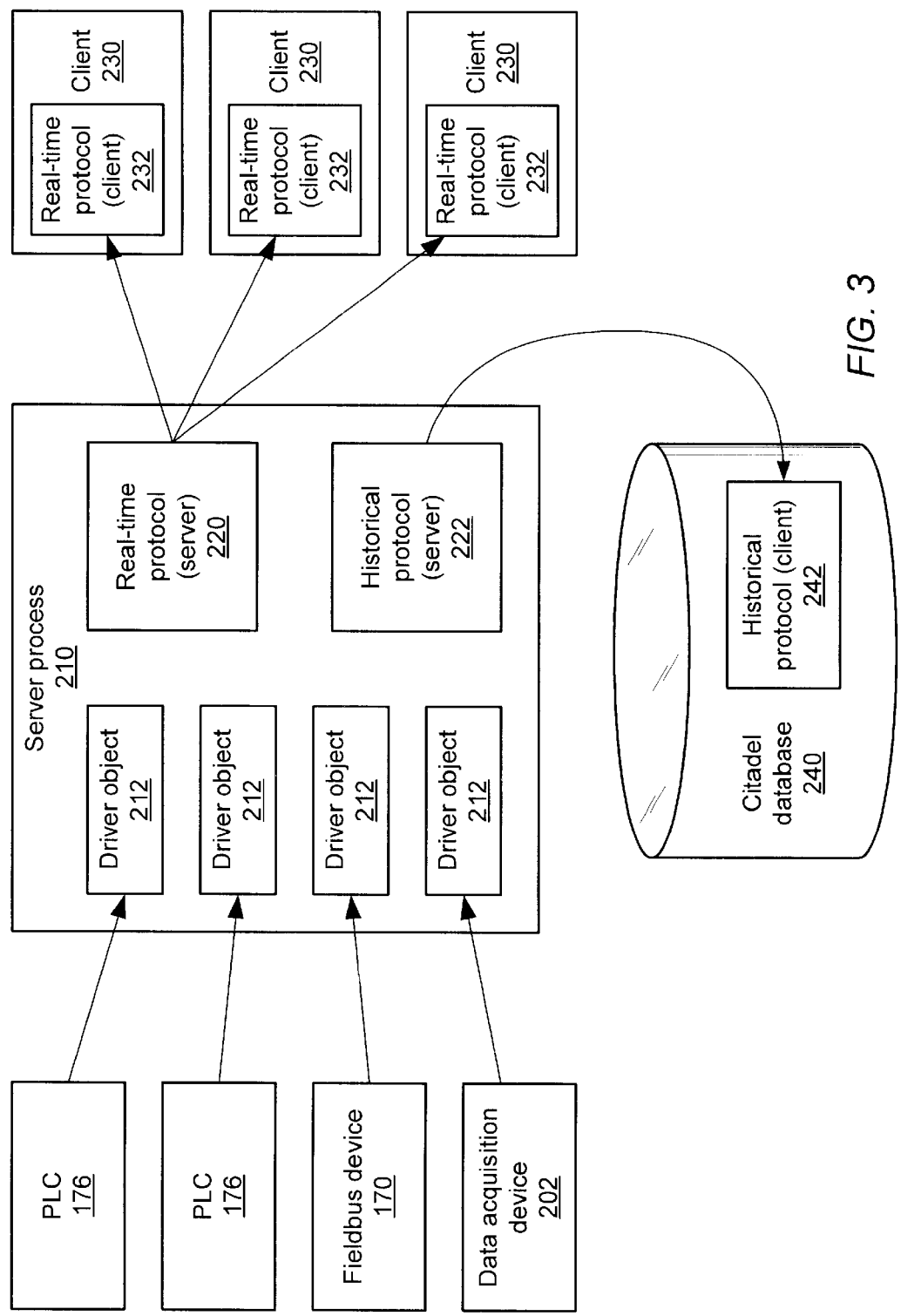
FIG. 3 illustrates the flow of data in the industrial automation system.

FIG. 3—Flow of Data

FIG. 3 illustrates the flow of data in an industrial automation system of the present invention. Data is generated or acquired by one or more hardware data acquisition devices: for example, as shown in the illustration, two programmable logic controllers (PLCs) 176, a fieldbus device 170, and a generic data acquisition device 202. As discussed with reference to FIG. 1, the present invention contemplates that a plurality and a variety of data acquisition devices may be connected to a single server; the four devices in FIG. 3 are presented for illustrative purposes only. A server computer system 210 includes one or more driver objects 212, at least one real-time protocol server 220, and optionally a historical protocol server 222. Each of the driver objects 212, real-time server(s) 220, and historical server(s) 222 are preferably software objects executing in the server computer system 210. At least one client computer system 230 is connected to the server computer system 210. Each client computer system 230 includes a real-time protocol client 232. The real-time client 232 is preferably a software object executing in the client computer system 230. One or more historical databases 240 are optionally linked to the server computer system 210. Each historical database 240 includes a historical protocol server 242. The historical server 242 is preferably a software object executing within the historical database 240.

Each data acquisition device (as illustrated, 176, 170, and 202) is connected to the server 210 through a driver object 212 stored on the server 210, wherein the driver object 212 is operable to enable communication with the particular data acquisition device. Upon notification by a data acquisition device that the device has generated data, the server 210 reads a block of data from the device by means of the driver 212 for that device.

The server 210 maintains a database of clients 230 who have subscribed to the data being gathered by a particular hardware data acquisition device. The server 210 then uses a server-side real-time protocol 220 to send the particular data elements to the clients 230 who have subscribed to the particular set of data. In the preferred embodiment, the real-time protocol is the Logos real-time protocol, which provides efficient exception-based reporting, data compression using delta compression, a "train station" model, and subscriptions to data using Universal Resource Locators (URLs) such as those used on the Internet. On the other end of the connection, the clients 230 use a client-side real-time protocol 232 to read the data from the server 210 and then decompress the data and update the data values stored at the client. Again, in the preferred embodiment the real-time protocol on the client side is the Logos real-time protocol.

In one embodiment, the server process 210 determines if a plurality of clients 230 are interested in at least a subset of the same data elements. If so, the server process 210 operates to generate a multi-cast packet which is a packet comprising data element values, preferably in a compressed format, which are desired by each of the plurality of clients. Once this packet is completed, i.e., when it has reached a certain size or when a certain timeout period has elapsed, the server process 210 operates to multi-cast this packet to each of the plurality of clients 232 which are interested in this common data. A multi-cast packet is not required to be separately transmitted for each destination client 230. Rather, a multi-cast packet is transmitted only once, and routers operate to route the multi-cast packet to each of the plurality of destinations. This further reduces network traffic by reducing the amount of individual packets which would normally be required to be transmitted in a point-to-point single-cast system.

The present invention also permits a server 210 to send historical data to one or more databases 240 for more permanent record-keeping. In FIG. 3, the server 210 uses a client-side historical protocol 222 to send data to a database 240, where the database 240 in turn uses a server-side historical protocol 242 to record data from the server 210. The invention contemplates that one or more databases 240 may subscribe to a particular set of data that has been generated by a hardware data acquisition device; for illustrative purposes, however, FIG. 3 shows only one database. In the preferred embodiment, as illustrated in FIG. 3, the database 240 is the Citadel database.

Figure 4:
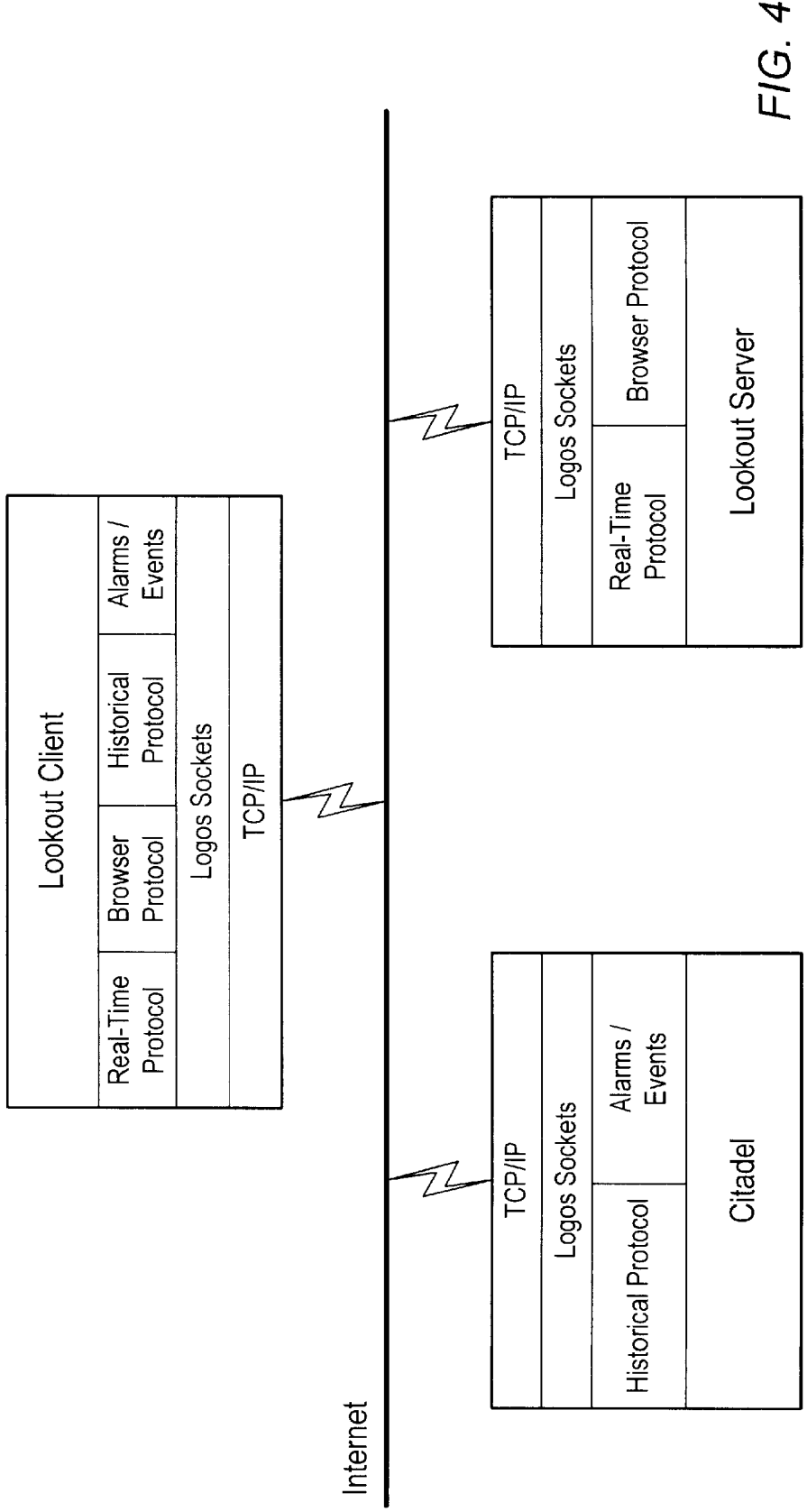
FIG. 4 illustrates the architecture of client, server and database nodes.

FIG. 4—Architecture of Client, Server, and Database Nodes

FIG. 4 illustrates the architecture of client and server programs in the system of FIG. 2. As shown, each client includes real-time protocol functionality, browser protocol functionality, historical protocol functionality, and alarms/events functionality. Each of the above functions interfaces to an underlying network protocol. In the preferred embodiment, the underlying network protocol is the TCP/IP protocol which is used for the Internet. Each of the above functions interfaces through sockets referred to as Logos sockets to the TCP/IP protocol. The Logos sockets provide an interface between the TCP/IP protocol and each of the real-time protocol, browser protocol, historical protocol, and alarms/events functionality.

In a similar manner, each server preferably includes real-time protocol functionality and browser protocol functionality which interfaces through Logos sockets to the TCP/IP protocol. A computer system which implements a database, referred to as the Citadel database, preferably includes historical protocol functionality and alarms/events functionality which each interface through Logos sockets to the TCP/IP protocol.

The Logos sockets in the preferred embodiment provide reliable TCP/IP socket functionality which places no limit on message size, provides rapid notification of status changes, and automatically re-establishes connections. The Logos sockets also use shared memory or TCP/IP as appropriate and further utilize a "classified ads" directory service. In the classified ads system, services such as the Lookout industrial automation system and the Citadel database register their names and port numbers with the classified ads service on the local machine. The first time a Logos socket is created on a particular client machine for connection to a remote machine, Logos subscribes to the service-port map maintained by the classified ads service on the remote machine. When a client requests a connection to a service on a remote machine, Logos looks up the port number in the service-port map for that remote machine and uses that port number to connect to the service directly.

The Logos real-time protocol implemented each by service and clients provides improved data transfer throughout the network with reduced bandwidth requirements. This real-time protocol utilizes subscription using URLs (Universal Resource Locators), report by exception, data compression, a novel "train station" model, and operates to handle both OPC (OLE for Process Control) and DataSocket formats. The Logos real-time protocol is used instead of standards such as OPC and DCOM (distributed COM) because the real-time protocol provides the advantages of data compression, reduced network bandwidth, and rapid notification of status changes. OPC can operate on top of the Logos real-time protocol, providing the benefits of both.

The Logos browser protocol supports the browsing of data items in all servers that publish data on the Logos network. It is used for both real-time and historical data, handles hierarchical name spaces, automatically refreshes tree views, specifies ranges as well as item names, and includes additional attributes, e.g., whether the item is logged historically.

The Logos historical protocol is used to efficiently move historical data across a network between Citadel and it clients. It operates to cache data locally for reading and logging, transmits network messages using a native Citadel format, handles temporarily broken connections, operates to log quality along with data, and operates with multiple Citadel servers, with multiple clients per server, and with subscriptions to historical data.

The Logos alarms/events protocol is used to efficiently move alarms and events data across a network between Citadel and its clients. Alarms comprise three events: activate, deactivate, and acknowledge. In the Logos alarms/events protocol, an explanation can accompany an acknowledgement. Further, alarms are categorized by priority and area, and clients can subscribe to a filtered set of alarms/events. This protocol supports any number of subscriptions.

Figure 5:
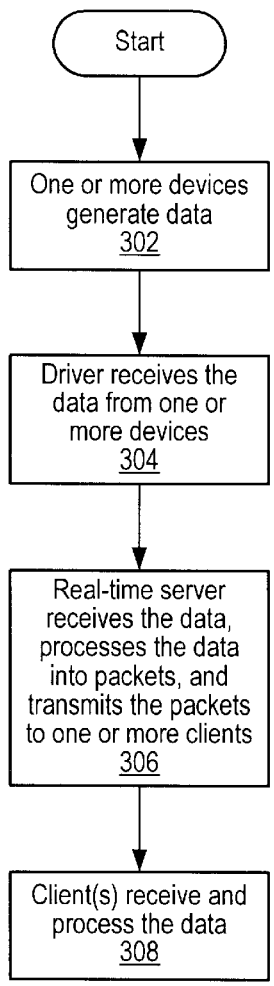
FIG. 5 is a flowchart illustrating the path of data flow from device to server to client.

FIG. 5—Path of Data from Hardware to Real-Time Protocol Server to Client

FIG. 5 illustrates the path of data flow from device to server to client. In step 302 one or more hardware data acquisition devices acquire or generate data. In step 304 a driver object, contained within the server process, receives the data from one or more hardware devices after being notified by the device of data generation. Steps 302 and 304 may be performed for a plurality of devices and drivers connected to one or more servers.

In step 306 the data is transferred from one or more drivers to the real-time server, which is also contained within the server process, and which is where the data is packaged and prepared for output to one or more clients. The industrial automation system of the present invention may include more than one server process. In the preferred embodiment, the server process uses the Logos real-time protocol to package and transmit data to clients. The Logos real-time protocol allows benefits such as reporting by exception and data compression using delta values. In step 308 one or more clients receive the data from one or more real-time servers. The clients then utilize the Logos real-time protocol to decompress the data and update data values already received by the clients.

Figure 6:
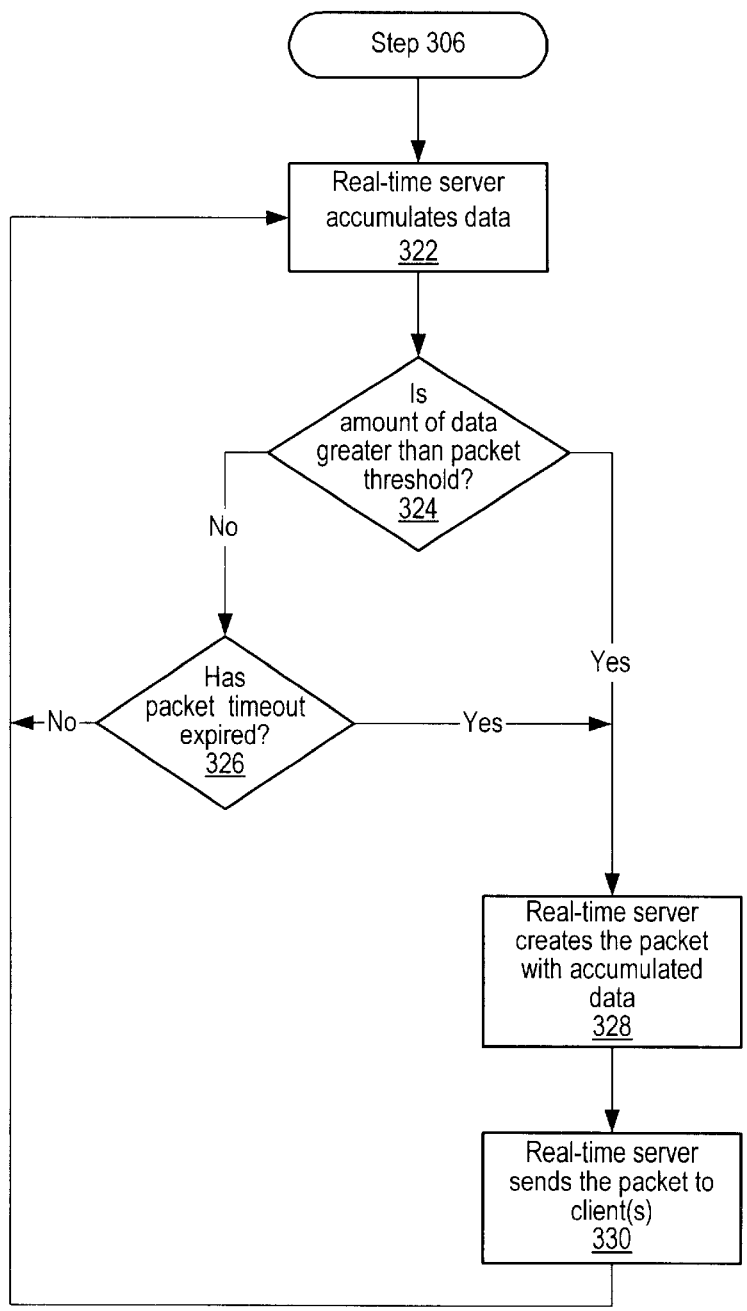
FIG. 6 is a flowchart illustrating the packaging and sending of data by the realtime protocol server using a "train station" model.

FIG. 6—Train Station Model

FIG. 6 illustrates the "train station" model of data transmission employed by the real-time protocol. The steps set forth in FIG. 6 may be performed a plurality of times for each real-time server described in step 306. FIG. 6 is a refinement of step 306 as set forth in FIG. 5. In step 322 data is accumulated in the real-time server as it arrives from one or more hardware devices through one or more drivers. In step 324 the real-time server decides whether the amount of data in the packet is greater than a threshold packet size; in other words, whether the "train" is filled up to a predetermined capacity, e.g. a maximum capacity, with "passengers." If the amount of data is not greater than the threshold packet size, then in step 326 the real-time server decides whether the packet timeout has expired: in other words, whether the "train" has sat in the "station" for a long enough period of time. If neither test is met, i.e., the amount of data is less than the packet threshold and the packet timeout has not expired, then the real-time server does not send a packet; instead, the method loops back to step 322 to continue accumulating data. When the test in either step 324 or step 326 is met, i.e., the amount of data is less than the packet threshold and the packet timeout has not expired, then in step 328 the real-time server creates a packet with the accumulated data. In the preferred embodiment, the packet is created with the benefits of the Logos real-time protocol, such as delta compression and exception-based reporting (i.e., only the changes in data are sent). In step 330 the real-time server sends the packet to one or more clients who have subscribed to the data. Once this packet (or "train") has been sent, the process begins anew with the accumulation of data for another packet at step 322.

Figure 7:
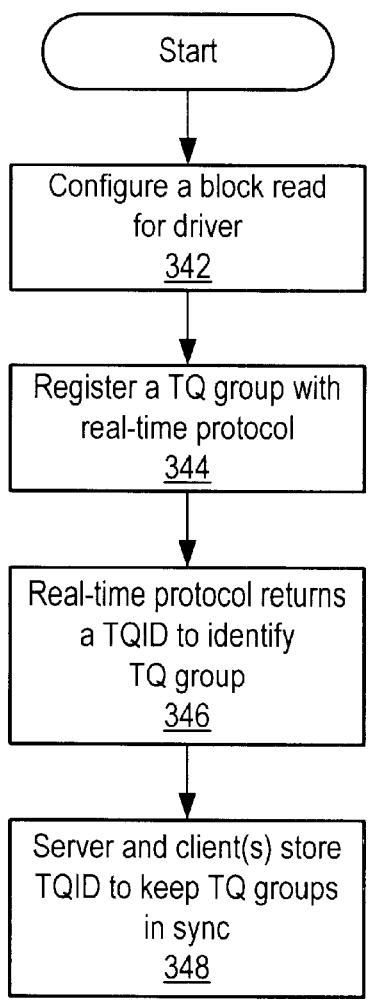
FIG. 7 is a flowchart illustrating the registration of a time/quality group.

FIG. 7—Registration of a Time/Quality Group

FIG. 7 illustrates the registration of a time/quality (TQ) group. FIG. 7 occurs as part of the configuration of the driver, prior to the acquisition of data. In step 342 the server process configures a block read. A block is a set of associated data elements which will be acquired or read at substantially the same time.

In step 344 the server process registers the block with the real-time protocol as a time/quality (TQ) group. A TQ group is a set of associated data elements which will share a single timestamp and a single quality value. A quality value represents the presence or absence of error conditions which affect the quality of the data at the time it is generated by the data acquisition device.

In step 346 the real-time protocol returns a time/quality identification value (TQID) for the TQ group registered in step 344. The TQID identifies data elements as belonging to a particular TQ group.

In step 348 both the subscribing client(s) and the server store the TQID for each TQ group. When the server sends to the client(s) a TQ group, as explained in the discussion of FIG. 8 below, the TQID will serve as a reference to a particular TQ group and allow the clients and server to keep TQ groups synchronized.

FIG. 7 occurs once for each of a plurality of TQ groups.

Figure 8:
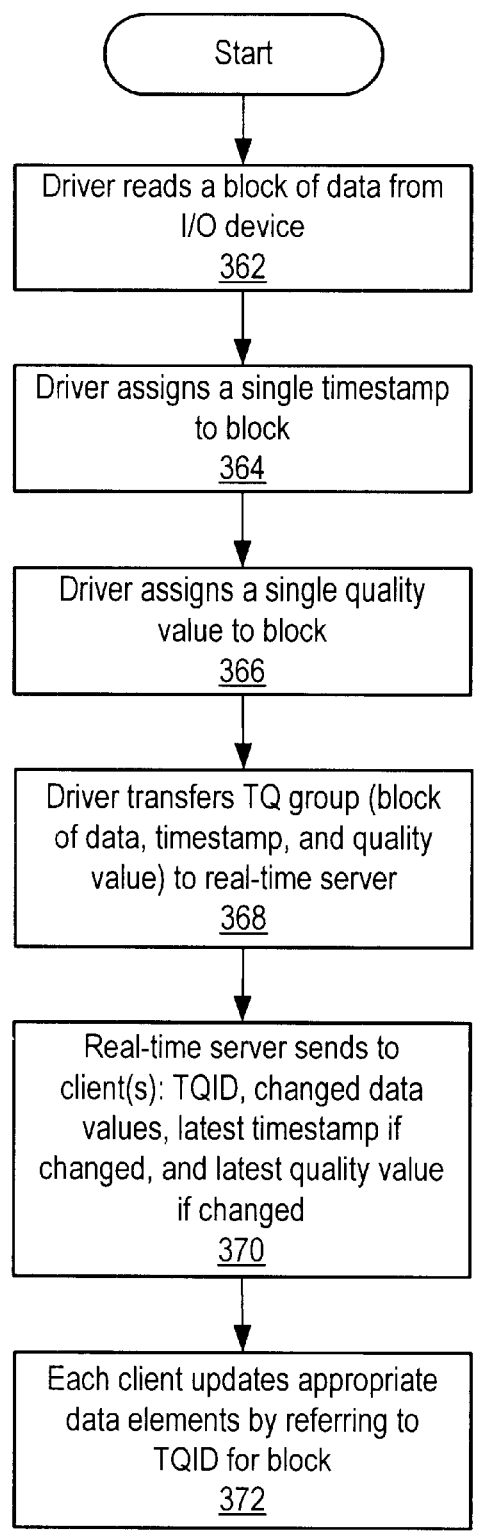
FIG. 8 is a flowchart illustrating the acquisition of a time/quality group.

FIG. 8—Acquisition of a Time/Quality Group

FIG. 8 illustrates the acquisition of a time/quality (TQ) group by a driver. Steps 362 through 366 are a refinement of step 304, as set forth in FIG. 5. Steps 368 and 370 are a refinement of step 306. Step 372 is a refinement of step 308.

In step 362 the driver object receives a block of data from a hardware data acquisition device, wherein the block represents one or more cycles of data acquisition.

In step 364 the driver object assigns to this block of data elements a single timestamp, wherein the timestamp indicates the time at which the data was received by the driver object. Because the data elements are received at the same time or substantially the same time, the method assigns a single timestamp for the entire block of data elements for efficiency purposes.

In step 366 the driver object assigns to the block of data a single quality value, wherein the quality value represents the presence or absence of error conditions which affect the quality of the data at the time it is generated by the data acquisition device. In the preferred embodiment, the quality value is a 32-bit value, wherein each bit signifies a specific error condition that affects the quality of the data or the communication between the hardware device and the driver. In general, each data element of the block of data will have the same quality value because the data elements are read from the same data acquisition device within a short period of time; an error that affects one of the data elements usually affects all of the data elements. Therefore, the method operates to assign a single quality value to the entire block of data for efficiency purposes.

In step 368 the driver object transfers the block of data, which includes a plurality of data elements, the single timestamp, and the single quality value, to the real-time server. This block of data is a time/quality (TQ) group: a set of associated data elements which share a single timestamp and a single quality value. The TQ group has an associated TQID.

In step 370 the real-time server transfers the TQ group to the subscribing client(s). Using the real-time protocol, which is preferably the Logos real-time protocol, the server process determines which of the data values have changed, whether the timestamp for the TQ group has changed, and whether the quality value for the TQ group has changed. The real-time server then sends as a block the TQID, those data elements which have changed, the latest timestamp for the TQ group, if changed, and the latest quality value for the TQ group, if changed. By sending at most a single timestamp and at most a single quality value for each block of data elements, the real-time server reduces network traffic and contributes to the efficiency of the present invention.

In step 372 each client updates the appropriate data elements which are stored by the client. The client achieves this end by matching the TQID of the newly received data elements with the TQID of the previously received data elements. For example, if the timestamp or the quality value has changed for the entire TQ group, then only one instance of the timestamp or quality value is sent to the client, and the client can update all the data elements of the TQ group with the new timestamp or quality value. Thus the use of the TQID contributes to the efficiency of the present invention.

FIG. 8 occurs a plurality of times for each of a plurality of TQ groups.

Logos RealTime Message Specification

This section includes specifications of message exchange between Logos real-time clients and Logos real-time servers according to the preferred embodiment. The messages in this description exist in the application layer. As set forth below, each message has a type and format and is sent either by a Logos real-time client or a Logos real-time server. Messages are divided into two categories: client messages and server messages. To reduce network traffic and achieve efficiency, each type of message can be a multiplexed message which groups multiple messages of same type together. All messages in the Logos real-time protocol are immediate messages: in line with the real-time purpose of the protocol, there is no need for the sender to block and wait for the response from the other end.

Client Messages

Subscribe

Format

| uint8 | uint16 | COMP_ID | string | uint8 | float | float | ...... |
|-------|--------|---------|--------|-------|-------|-------|--------|
| type  | multiNo | clientID | szPoint | flags | updaterate | deadband | (clientID...) |

Note: () means optional type:
    message type is SUBSCRIBE multiNo:
    the number of grouped messages. multiNo should be always no less than 1. If there is more than 1 grouped message, the next one starts right after the deadband.

clientID:
    this ID will be given to server. So whenever server sends response to a specific point by including this clientID, the client can dispatch to the right point. However the ID existing in the message is a compressed id because, internally, clientID is created using the index starting from 1. The COMP_ID may use either 1, 2, 3, or 4 bytes to pack this clientID. There are special functions to serialize and deserialize this clientID into COMP_ID form. The least-significant bit of the first byte determines whether 1 or more bytes comprise the value. If only one byte is used, then the more-significant 7 bits of that byte encode a value between −64 and 63. If more than one byte is used, then the second least-significant bit of the first byte determines whether 2 or more bytes comprise the value. If two bytes are used, then the more significant 14 bits of the two bytes encode a value between −2^13 and 2^13. If more than two bytes are used, then the third least-significant bit of the first byte determines whether three or four bytes comprise the value. If three bytes are used, then the more significant 21 bits of the three bytes encode a value between −2^20 and 2^20. If four bytes are used, then the more significant 29 bits of the four bytes encode a value between −2^28 and 2^28.

szPoint:
　this is the name of the LogosRealTimePoint to subscribe at the server end.

flags:
　this tells subscription state, it can be the combination of IAKSUB_ACTIVATE, IAKSUB_TIMESTAMP and IAKSUB_QUALITY.

updaterate:
　specifies the updaterate of this point deadband:
　specifies the quantum for this point Description The SUBSCRIBE message allows clients to subscribe Logos RealTime points to Control Environment Server. Thus the client can modify the point and get the updated value from server.

Comments

Subscriptions to points at Control Environment are always successful. The response message SUBSUCCEED returns the ServerID of the LogosRealTime Point.

MODIFY
Format

| uint8 | uint16 | COMP_ID | uint8 | double / string / RawData | ... ... |
|---|---|---|---|---|---|
| type | multiNo | serverID | flags | (value) | (serverID...) | type:
　message type is MODIFY multiNo:
　the number of grouped messages. multiNo should be always no less than 1. If there are more than 1 grouped messages, the next one starts right after the value.

serverID:
　this ID will be used by the server to dispatch the MODIFY message to the right point. The client acquires the serverID when it receives the SUBSUCCEED message. However the ID existing in the message is a compressed id, because internally, serverID is created using the index starting from 1. The COMP_ID may use either 1, 2, 3, or 4 bytes to pack this serverID. There are special functions to serialize and deserialize this serverID into COMP_ID form.

flags and value:
　The combination of flags and value specified what's the value actually packed in the message:
　　If for logical value (i.e. flags & MODIFY_VALUES= MODIFY_LOGICAL)
　　　Then MODIFY_LOGVALUE bit in the flags tell either true or false by (flags & MODIFY_ LOGVALUE)
　　If for numeric value (i.e. flags & MODIFY_VALUES= MODIFY_NUMERIC)
　　　Then value is the double type.
　　If for ansi/unicode value (i.e. flags & MODIFY_ VALUES=MODIFY_ANSI||flags & MODIFY_ VALUES=MODIFY_UNI)
　　　then value is CitaStr.
　　If for raw value (i.e. flags & MODIFY_VALUES= MODIFY_RAW)
　　　Then value is pure data and the length of data Description The MODIFY message allows clients to change the item's value on the server.

SETSTATE
Format

| uint8 | uint16 | COMP_ID | uint8 | float | float | ... ... |
|---|---|---|---|---|---|---|
| type | multiNo | clientID | flags | updaterate | deadband | (clientID...) | type:
　message type is SETSTATE multiNo:
　the number of grouped messages. multiNo should be always no less than 1. If there are more than 1 grouped messages, the next one starts right after the deadband.

serverID:
　this ID will be used by the server to dispatch the SETSTATE message to the right point. The client acquired the serverID when it received the SUBSUCCEED message. However the ID existing in the message is a compressed id, because internally, serverID is created using the index starting from 1. The COMP_ID may use either 1,2,3 or 4 bytes to pack this serverID. There are special functions to serialize and deserialize this serverID into COMP_ID form.

flags:
　this flags tells whether subscription state get changed.
　　If (flags & SETSTATE_SUBACTIVATE)
　　　Then the SETSTATE_ACTIVATE bit of flags tells whether state becomes active or not by (flags & SETSTATE_ACTIVATE).
　　If (flags & SETSTATE_SUBTIME)
　　　Then the SETSTATE_TIMESTAMP bit of flags tells whether timestamp becomes active or not by (flags & SETSTATE_TIMESTAMP).
　　If (flags & SETSTATE_SUBQUALITY)
　　　Then the SETSTATE_QUALITY bit of flags tells whether state becomes active or not by (flags & SETSTATE_QUALITY).

updaterate:
　Specified the new updaterate, if (flags & SETSTATE_ UPDATERATE).

deadband:
　Specified the new deadband, if (flags & SETSTATE_ DEADBAND).

Description

The SETSTATE message allows clients to change the subscription state of realtime point on the server.

UNSUBSCRIBE

Format

| uint8 | uint16 | COMP_ID | ...... |
|---|---|---|---|
| type | multiNo | clientID | (clientID...) | type:
   message type is UNSUBSCRIBE
multiNo:
   the number of grouped messages. multiNo should be always no less than 1. If there are more than 1 grouped messages, the next one starts right after the deadband.
serverID:
   this ID will be used by the server to dispatch the UNSUBSCRIBE message to the right point. The client acquired the serverID when it received the SUBSUCCEED message. However the ID existing in the message is a compressed id, because internally, serverID is created using the index starting from 1. The COMP_ID may use either 1,2,3 or 4 bytes to pack this serverID. There are special functions to serialize and deserialize this serverID into COMP_ID form.

Description

UNSUBSCRIBE message allows clients to unsubscribe realtime point from the server.

Server Messages

SUBSUCCEED

Format

| uint8 | uint16 | COMP_ID | COMP_ID | ...... |
|---|---|---|---|---|
| type | multiNo | clientID | serverID | (clientID...) | type:
   message type is SUBSUCCEED
multiNo:
   the number of grouped messages. multiNo should be always no less than 1. If there are more than 1 grouped messages, the next one starts right after the deadband.
clientID:
   this ID will be used by the client to dispatch the SUBSUCCEED message to the right point. The client acquired this ID when it received the SUBSCRIBE message from the client. However the ID existing in the message is a compressed id, because internally, clientID is created by the client using the index starting from 1. The COMP_ID may use either 1,2,3 or 4 bytes to pack this clientID. There are special functions to serialize and deserialize this clientID into COMP_ID form.
serverID:
   this ID will be assigned to the client. The client can use this ID if it wants to send MODIFY or SETSTATE message to talk to the right point on the server end. However the ID existing in the message is a compressed id, because internally, serverID is created using the index starting from 1. The COMP_ID may use either 1,2,3 or 4 bytes to pack this serverID. There are special functions to serialize and deserialize this serverID into COMP_ID form.

Description

The Server sends SUBSUCCEED message in response to SUBSCRIBE message from the client.

UPDATEPOINT

Format

| uint8 | uint16 | COMP_ID | uint8 | uint32 | TIME_FMT | VAL_FMT | uint8 | float | float | ...... |
|---|---|---|---|---|---|---|---|---|---|---|
| type | multiNo | cltID | flags | (quality) | (time) | (value) | (nflags) | (rate) | (db) | (cltID...) | type:
   message type is UPDATEPOINT
multiNo:
   the number of grouped messages. multiNo should be always no less than 1. If there are more than 1 grouped messages, the next one starts right after the deadband.
citID:
   this ID will be used by the client to dispatch the UPDATEPOINT message to the right point. The client acquired this ID when it received the SUBSCRIBE message from the client. However the ID existing in the message is a compressed id, because internally, cltID is created by the client using the index starting from 1. The COMP_ID may use either 1,2,3 or 4 bytes to pack this cltID. There are special functions to serialize and deserialize this cltID into COMP_ID form.
flags, quality, time, value, nflag:
   The combination of flags and quality, time, value, nflags decides the information encoded.
   If (flags & UPDATEPOINT_QUALITY), then quality is encoded.
   If (flags & UPDATEPOINT_TIMESTAMP), then time is encoded. However the TIME_FMT is different based on whether it is a delta time or original time.
      If delta time (if flags & UPDATEPOINT_DELTATIME), then TIME_FORMAT is a special format. It uses from 1 to 8 bytes based on the delta time size. There are special serialize and deserialize routines.
      Otherwise, it is of type int64.
   If (flags & UPDATEPOINT_VALUE), then value is encoded. However the VAL_FMT is different based on whether it is a delta value or original value
      If delta value (if flags & UPDATEPOINT_DELTAVALUE), then VAL_FMT is a special format. It uses from 1 to 8 bytes based on the delta time size. There are special serialize and deserialize routines.
      Otherwise, based on the type of value, it will encode the original data.
   If (flags & UPDATEPOINT_NEXT), then nflags is encoded.
updaterate:
   Specifies new updaterate, if f (nflags & UPDATEPOINT_UPDATERATE)
deadband:
   Specifies new updaterate, if f (nflags & UPDATEPOINT_DEADBAND)

Description

The Server sends UPDATEPOINT message whenever realtime point updates at the server end.

UPDATEATTR
Format

| uint8 | uint16 | COMP_ID | uint32 | uint16 | uint16 | uint32 |
|---|---|---|---|---|---|---|
| type | multiNo | clientID | flags | (signal) | (canonicalType) | (accessRight) | type:
  message type is UPDATEATTR
multiNo:
  the number of grouped messages. multino should be always no less than 1. If there are more than 1 grouped messages, the next one starts right after the accessRight.
clientID:
  this ID will be used by the client to dispatch the UPDATEATTR message to the right point. The client acquired this ID when it received the SUBSCRIBE message from the client. However the ID existing in the message is a compressed id, because internally, clientID is created by the client using the index starting from 1. The COMP_ID may use either 1, 2, 3, or 4 bytes to pack this clientID. There are special functions to serialize and deserialize this clientID into COMP_ID form.
flags, signal, canonicalType, accessRight::
  The combination of flags and signal, canonicalType, accessRight decides the attributes in the message
  If (flags & ITEMDETAIL_SIGNAL), then signal is encoded.
  If (flags & ITEMDETAIL_CANONICAL), then canonicalType is encoded.
  If (flags & ITEMDETAIL_ACCESS), then accessRight is encoded.
Description
  The Server sends UPDATEATTR message whenever the attributes of realtime point on the server is changed.
UPDATETBL
Format

| uint8 | uint16 | COMP_ID | uint32 | ... |
|---|---|---|---|---|
| type | multiNo | clientID | TQID | (clientID...) | type:
  message type is SUBSUCCEED
multiNo:
  the number of grouped messages. multiNo should be always no less than 1. If there are more than 1 grouped messages, the next one starts right after the deadband.
clientID:
  this ID will be used by the client to dispatch the UPDATETBL message to the right point. The client acquired this ID when it received the SUBSCRIBE message from the client. However the ID existing in the message is a compressed id, because internally, clientID is created by the client using the index starting from 1. The COMP_ID may use either 1,2,3 or 4 bytes to pack this clientID. There are special functions to serialize and deserialize this clientID into COMP_ID form.
TQID:
  this ID will be used by the client to delete a matching old TQ group if any and create a new TQ group.
Description
  The Server sends the UPDATETBL message whenever a TQ group is added or deleted from server.
UPDATETQ
Format

| uint8 | uint16 | uint32 | uint8 | uint32 | TIME_FMT | float | ... |
|---|---|---|---|---|---|---|---|
| type | multiNo | TQID | flags | (quality) | (time) | (updaterate) | (TQID...) | type:
  message type is SUBSUCCEED
multiNo:
  the number of grouped messages. multiNo should be always no less than 1. If there are more than 1 grouped messages, the next one starts right after the updaterate.
TQID:
  this TQID will be used by the client to update the specified TQ group.
quality:
  This specifies the quality of this TQ group, if (flags & UPDATETQ_QUALITY)
time:
  This specifies the timestamp of this TQ group, if (flags & UPDATETQ_TIMESTAMP). However the TIME_FORMAT is different based on whether it is a delta time or original time.
    If delta time is used (if flags & UPDATETQ_DELTATIME), then TIME_FORMAT is a special format. It uses from 1 to 8 bytes based on the delta time size. There are special serialize and deserialize routines.
    Otherwise, it is of type int64.
Description
  The Server sends UPDATETQ message whenever quality or timestamp of TQ group changed on the server.

Although the system and method of the present invention has been described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

What is claimed is:
1. A method for transferring real-time data in an industrial automation system comprising:
  a hardware device generating a first plurality of data elements and a second plurality of data elements;
  receiving each of the first plurality of data elements and the second plurality of data elements;

assigning a first timestamp to the first plurality of data elements;

assigning a second timestamp to the second plurality of data elements;

assigning a first quality value to the first plurality of data elements;

assigning a second quality value to the second plurality of data elements;

wherein the first plurality of data elements, the first timestamp, and the first quality value compose a first block of data elements;

wherein the second plurality of data elements, the second timestamp, and the second quality value compose a second block of data elements;

a server process determining which of the data elements of the second block are different from their counterparts in the first block;

the server process determining whether the second timestamp for the second block is different from the first timestamp for the first block;

the server process determining whether the second quality value for the second block is different from the first quality value for the first block; and the server process providing the first block of data elements and the second block of data elements to the one or more clients, wherein the first block and the second block are generated by the same hardware device, wherein the second block is provided to the clients after the first block, wherein the server process providing the second block to one or more clients comprises the server process providing as the second block only those second plurality of data elements which have changed, the second timestamp if changed, and the second quality value if changed.

2. The method of claim 1, further comprising:

registering one or more time/quality groups with the server process, wherein each time/quality group defines a set of associated data elements which share a single timestamp and a single quality value;

the server process creating one or more time/quality identification values, wherein each time/quality identification value identifies a particular time/quality group;

the server process storing the time/quality identification values as references to the time/quality groups;

one or more clients storing the time/quality identification values as references to the time/quality groups.

3. The method of claim 2, wherein the first block and the second block share a time/quality identification value;

wherein the server process providing the second block to one or more clients further comprises the server process providing as the second block only the time/quality identification value, those second plurality of data elements which have changed, the second timestamp if changed, and the second quality value if changed.

4. The method of claim 3, further comprising:

each of the clients updating the first timestamp, if changed, with the second timestamp only for data elements of the first block having the same time/quality identification value as the second block.

5. The method of claim 2, further comprising:

each of the clients updating the first quality value, if changed, with the second quality value only for data elements of the first block having the same time/quality identification value as the second block.

6. The method of claim 1, further comprising:

the server process generating a packet comprising one or more blocks received from one or more drivers;

the server process providing the packet to one or more clients in the industrial automation system.

7. The method of claim 1, further comprising:

the server process providing to one or more clients a plurality of packets, wherein each packet comprises one or more blocks, wherein the plurality of packets comprises the first block of data elements and the second block of data elements, wherein the first block and the second block share a time/quality identification value;

wherein the server process providing the packets to one or more clients further comprises the server process providing as the second block only the time/quality identification value, those data elements which have changed, the timestamp if changed, and the quality value if changed.

8. The method of claim 7, further comprising:

each of the clients receiving the packets;

each of the clients updating the first timestamp, if changed, with the second timestamp only for data elements of the first block having the same time/quality identification value as the second block.

9. The method of claim 7, further comprising each of the clients updating the first quality value, if changed, with the second quality value only for data elements of the first block having the same time/quality identification value as the second block.

10. The method of claim 1, wherein a server process comprises one or more drivers and a real-time server, wherein each driver is coupled to one or more hardware devices, and wherein the real-time server provides each of the first block of data elements and the second block of data elements of data elements to one or more clients in substantially real time.

11. The method of claim 1, wherein the quality value comprises a plurality of bits, wherein each bit signifies the presence or absence of a specific error condition.

12. The method of claim 1, wherein the method is performed for a plurality of hardware devices and a plurality of drivers, wherein each driver is coupled to one or more hardware devices.

13. The method of claim 1, wherein the industrial automation system comprises a network, wherein the network comprises a plurality of computer systems, wherein the plurality of computer systems comprises one or more server processes and one or more clients.

14. The method of claim 1, wherein the hardware device generating the first plurality of data elements and the second plurality of data elements, the receiving each of the first plurality of data elements and the second plurality of data elements, the assigning the first timestamp to the first plurality of data elements and the assigning the second timestamp to the second plurality of data elements, the assigning the first quality value to the first plurality of data elements and the assigning the second quality value to the second plurality of data elements, and the server process providing each of the first block of data elements and the second block of data elements to one or more clients occur a plurality of times.

15. A method for transferring real-time data in an industrial automation system comprising:

a hardware device generating a plurality of data elements;

receiving the plurality of data elements;

assigning a single timestamp to the plurality of data elements;

assigning a single quality value to the plurality of data elements;

wherein the plurality of data elements, the timestamp, and the quality value compose a block of data elements;

a server process providing the block of data elements to one or more clients;

registering one or more time/quality groups with the server process, wherein each time/quality group defines a set of associated data elements which share a single timestamp and a single quality value;

the server process creating one or more tine/quality identification values, wherein each time/quality identification value identifies a particular time/quality group;

the server process storing the time/quality identification values as references to the time/quality groups; and one or more clients storing the time/quality identification values as references to the time/quality groups.

16. The method of claim 15, further comprising:

the server process providing to one or more clients a first block of data elements and a second block of data elements, wherein the first block and the second block share a time/quality identification value, wherein the second block is provided to the clients after the first block;

the server process determining which of the data elements of the second block are different from their counterparts in the first block;

the server process determining whether the timestamp for the second block is different from its counterpart in the first block;

the server process determining whether the quality value for the second block is different from its counterpart in the first block;

wherein the server process providing the second block to one or more clients further comprises the server process providing as the block only the time/quality identification value, those data elements which have changed, the timestamp if changed, and the quality value if changed.

17. The method of claim 16, further comprising:

each of the clients updating the timestamp, if changed, only for data elements of the first block having the same time/quality identification value as the second block.

18. The method of claim 16, further comprising:

each of the clients updating the quality value, if changed, only for data elements of the first block having the same time/quality identification value as the second block.

19. The method of claim 15, further comprising:

the server process generating a packet comprising one or more blocks received from one or more drivers;

the server process providing the packet to one or more clients in the industrial automation system.

20. The method of claim 15, further comprising:

the server process providing to one or more clients a plurality of packets, wherein each packet comprises one or more blocks, wherein the plurality of packets comprises a first block of data elements and a second block of data elements, wherein the first block and the second block share a time/quality identification value, wherein the second block is provided to the clients after the first block;

the server process determining which of the data elements of the second block are different from their counterparts in the first block;

the server process determining whether the timestamp for the second block is different from its counterpart in the first block;

the server process determining whether the quality value for the second block is different from its counterpart in the first block;

wherein the server process providing the packets to one or more clients further comprises the server process providing as the second block only the time/quality identification value, those data elements which have changed, the timestamp if changed, and the quality value if changed.

21. The method of claim 20, further comprising:

each of the clients receiving the packets;

each of the clients updating the timestamp, if changed, only for data elements of the first block having the same time/quality identification value as the second block.

22. The method of claim 20, further comprising:

each of the clients updating the quality value, if changed, only for data elements of the first block having the same time/quality identification value as the second block.

23. The method of claim 15, wherein a server process comprises one or more drivers and a real-time server, wherein each driver is coupled to one or more hardware devices, and wherein the real-time server provides the block of data elements to one or more clients in substantially real time.

24. The method of claim 15, wherein the quality value comprises a plurality of bits, wherein each bit signifies the presence or absence of a specific error condition.

25. The method of claim 15, wherein the method is performed for a plurality of hardware devices and a plurality of drivers, wherein each driver is coupled to one or more hardware devices.

26. The method of claim 15, wherein the industrial automation system comprises a network, wherein the network comprises a plurality of computer systems, wherein the plurality of computer systems comprises one or more server processes and one or more clients.

27. The method of claim 15, wherein the hardware device generating a plurality of data elements, the receiving the block of data elements, the assigning a single timestamp to the block of data elements, the assigning a single quality value to the block of data elements, and the server process providing the block to one or more clients occur a plurality of times.

28. A method for transferring real-time data in an industrial automation system comprising:

a hardware device generating a first plurality of data elements and a second plurality of data elements;

receiving each of the first plurality of data elements and the second plurality of data elements;

assigning a first timestamp to the first plurality of data elements;

assigning a second timestamp to the second plurality of data elements;

assigning a first quality value to the first plurality of data elements;

assigning a second quality value to the second plurality of data elements;

wherein the first plurality of data elements, the first timestamp, and the first quality value compose a first block of data elements;

wherein the second plurality of data elements, the second timestamp, and the second quality value compose a second block of data elements;

the server process determining which of the data elements of the second block are different from their counterparts in the first block;

the server process determining whether the second timestamp for the second block is different from the first timestamp for the first block; and the server process determining whether the second quality value for the second block is different from the first quality value for the first block;

the server process providing to one or more clients a plurality of packets, wherein the plurality of packets comprises the first block of data elements and the second block of data elements, wherein the first block and the second block share a time/quality identification value, wherein the second block is provided to the clients after the first block;

wherein the server process providing the packets to one or more clients further comprises the server process providing as the second block only the time/quality identification value, those second plurality of data elements which have changed, the second timestamp if changed, and the second quality value if changed.

29. The method of claim 28, further comprising:

the server process generating a packet comprising one or more blocks received from one or more drivers;

the server process providing the packet to one or more clients in the industrial automation system.

30. The method of claim 28, further comprising:

each of the clients receiving the packets;

each of the clients updating the first timestamp, if changed, with the second timestamp only for data elements of the first block having the same time/quality identification value as the second block.

31. The method of claim 28, further comprising:

each of the clients updating the first quality value, if changed, with the second quality value only for data elements of the first block having the same time/quality identification value as the second block.

32. The method of claim 28, wherein the server process comprises one or more drivers and a real-time server, wherein each driver is coupled to one or more hardware devices, and wherein the real-time server provides each of the first block of data elements and the second block of data elements to one or more clients in substantially real time.

33. The method of claim 28, wherein the quality value comprises a plurality of bits, wherein each bit signifies the presence or absence of a specific error condition.

34. The method of claim 28, wherein the method is performed for a plurality of hardware devices and a plurality of drivers, wherein each driver is coupled to one or more hardware devices.

35. The method of claim 28, wherein the industrial automation system comprises a network, wherein the network comprises a plurality of computer systems, wherein the plurality of computer systems comprises one or more server processes and one or more clients.

36. The method of claim 28, wherein the hardware device generating the first plurality of data elements and the second plurality of data elements, the receiving each of the first plurality of data elements and the second plurality of data elements, the assigning the first timestamp to the first plurality of data elements and the assigning the second timestamp to the second plurality of data elements, the assigning the first quality value to the first plurality of data elements and the assigning the second quality value to the second plurality of data elements, and the server process providing each of the first block of data elements and the second block of data elements to one or more clients occur a plurality of times.

37. An industrial automation system, comprising:

one or more I/O devices, wherein each I/O device generates a plurality of data elements;

a server computer system coupled to at least one of the I/O devices, wherein the server computer system includes a central processing unit (CPU), a display screen, memory, and one or more input devices;

wherein the memory stores one or more drivers, wherein each driver is linked to at least one I/O device and receives a set of data elements from the linked I/O device;

wherein each driver is executable to assign a single timestamp and a single quality value to the set of data elements received from the linked I/O device;

wherein the memory stores a real-time server, wherein the real-time server receives a plurality of blocks from at least one driver, wherein each block comprises the set of data elements, the single timestamp, and the single quality value;

wherein the memory stores a server process, wherein the server process comprises one or more drivers and the real-time server;

one or more client computer systems, wherein each client computer system receives a plurality of blocks from the real-time server;

wherein the server process is executable to provide to the one or more client computer systems a first block of data elements and a second block of data elements, wherein the first block and the second block are generated by the same I/O device, wherein the second block is provided to the client computer systems after the first block;

wherein the server process is executable to determine which of the data elements of the second block are different from their counterparts in the first block;

wherein the server process is executable to determine whether the timestamp for the second block is different from its counterpart in the first block;

wherein the server process is executable to determine whether the quality value for the second block is different from its counterpart in the first block; and wherein the real-time server is executable to provide to the one or more client computer systems a plurality of blocks, wherein each block comprises only those data elements which have changed, the timestamp if changed, and the quality value if changed.

38. The system of claim 37,
wherein the server process is executable to register one or more time/quality groups, wherein each time/quality group defines a set of associated data elements which share a single timestamp and a single quality value;
wherein the server process is executable to create one or more time/quality identification values, wherein each time/quality identification value identifies a particular time/quality group;
wherein the server process stores the time/quality identification values as references to the time/quality groups;
wherein the one or more client computer systems store the time/quality identification values as references to the time/quality groups.

39. The system of claim 38,
wherein the real-time server is executable to provide to the one or more client computer systems a plurality of blocks, wherein each block comprises the time/quality identification value for the block, only those data elements which have changed, the timestamp if changed, and the quality value if changed.

40. The system of claim 39,
wherein each of the client computer systems updates the timestamp, if changed, only for data elements of the first block having the same time/quality identification value as the second block.

41. The system of claim 39,
wherein each of the client computer systems updates the quality value, if changed, only for data elements of the first block having the same time/quality identification value as the second block.

42. The system of claim 37,
wherein the real-time server is executable to generate a packet, wherein the packet comprises one or more blocks received from one or more drivers;
wherein the real-time server provides the packet to one or more client computer systems in the industrial automation system.

43. The system of claim 42,
wherein the server process is executable to provide to one or more clients a plurality of packets, wherein each packet comprises one or more blocks, wherein the plurality of packets comprises the first block of data elements and the second block of data elements, wherein the first block and the second block share a time/quality identification value;
wherein the server process is executable to provide as the second block to the clients only the time/quality identification value, those data elements which have changed, the timestamp if changed, and the quality value if changed.

44. The system of claim 43,
wherein each of the client computer systems receives the packet;
wherein each of the client computer systems updates the timestamp, if changed, only for those data elements of the first block having the same time/quality identification value as the second block.

45. The system of claim 43,
wherein each of the client computer systems updates the quality value, if changed, only for those data elements of the first block having the same time/quality identification value as the second block.

46. The system of claim 37,
wherein the real-time server provides the blocks of data elements to one or more client computer systems in substantially real time.

47. The system of claim 37,
wherein the quality value comprises a plurality of bits, wherein each bit signifies the presence or absence of a specific error condition.

48. The system of claim 37, further comprising:
a network, wherein the network comprises a plurality of computer systems, wherein the plurality of computer systems comprises one or more server computer systems and one or more client computer systems.

49. An industrial automation system, comprising:
one or more I/O devices, wherein each I/O device generates a plurality of data elements;
a server computer system coupled to at least one of the I/O devices, wherein the server computer system includes a central processing unit (CPU), a display screen, memory, and one or more input devices;
wherein the memory stores one or more drivers, wherein each driver is linked to at least one I/O device and receives a set of data elements from the linked I/O device;
wherein each driver is executable to assign a single timestamp and a single quality value to the set of data elements received from the linked I/O device;
wherein the memory stores a real-time server, wherein the real-time server receives a plurality of blocks from at least one driver, wherein each block comprises the set of data elements, the single timestamp, and the single quality value;
wherein the memory stores a server process, wherein the server process comprises one or more drivers and the real-time server;
one or more client computer systems, wherein each client computer system receives a plurality of blocks from the real-time server;
wherein the server process is executable to register one or more time/quality groups, wherein each time/quality group defines a set of associated data elements which share a single timestamp and a single quality value;
wherein the server process is executable to create one or more time/quality identification values, wherein each time/quality identification value identifies a particular time/quality group;
wherein the server process stores the time/quality identification values as references to the time/quality groups; and
wherein the one or more client computer systems store the time/quality identification values as references to the time/quality groups.

50. The system of claim 49,
wherein the server process is executable to provide to the one or more client computer systems a first block of data elements and a second block of data elements, wherein the first block and the second block are generated by the same I/O device, wherein the second block is provided to the client computer systems after the first block;
wherein the server process is executable to determine which of the data elements of the second block are different from their counterparts in the first block;
wherein the server process is executable to determine whether the timestamp for the second block is different from its counterpart in the first block;
wherein the server process is executable to determine whether the quality value for the second block is different from its counterpart in the first block;

wherein the real-time server is executable to provide to the one or more client computer systems a plurality of blocks, wherein each block comprises the time/quality identification value for the block, only those data elements which have changed, the timestamp if changed, and the quality value if changed.

51. The system of claim 50, wherein each of the client computer systems updates the timestamp, if changed, only for data elements of the first block having the same time/quality identification value as the second block.

52. The system of claim 50, wherein each of the client computer systems updates the quality value, if changed, only for data elements of the first block having the same time/quality identification value as the second block.

53. The system of claim 49, wherein the real-time server is executable to generate a packet, wherein the packet comprises one or more blocks received from one or more drivers; wherein the real-time server provides the packet to one or more client computer systems in the industrial automation system.

54. The system of claim 53, wherein the server process is executable to provide to one or more clients a plurality of packets, wherein each packet comprises one or more blocks, wherein the plurality of packets comprises a first block of data elements and a second block of data elements, wherein the first block and the second block share a time/quality identification value, wherein the second block is provided to the clients after the first block; wherein the server process is executable to determine which of the data elements of the second block are different from their counterparts in the first block; wherein the server process is executable to determine whether the timestamp for the second block is different from its counterpart in the first block; wherein the server process is executable to determine whether the quality value for the second block is different from its counterpart in the first block; wherein the server process is executable to provide as the second block to the clients only the time/quality identification value, those data elements which have changed, the timestamp if changed, and the quality value if changed.

55. The system of claim 54, wherein each of the client computer systems receives the packet; wherein each of the client computer systems updates the timestamp, if changed, only for those data elements of the first block having the same time/quality identification value as the second block.

56. The system of claim 54, wherein each of the client computer systems updates the quality value, if changed, only for those data elements of the first block having the same time/quality identification value as the second block.

57. The system of claim 49, wherein the real-time server provides the blocks of data elements to one or more client computer systems in substantially real time.

58. The system of claim 49, wherein the quality value comprises a plurality of bits, wherein each bit signifies the presence or absence of a specific error condition.

59. The system of claim 49, further comprising: a network, wherein the network comprises a plurality of computer systems, wherein the plurality of computer systems comprises one or more server computer systems and one or more client computer systems.

60. An industrial automation system, comprising:
one or more I/O devices, wherein each I/O device generates a plurality of data elements;
a server computer system coupled to at least one of the I/O devices, wherein the server computer system includes a central processing unit (CPU), a display screen, memory, and one or more input devices;
wherein the memory stores one or more drivers, wherein each driver is linked to at least one I/O device and receives a set of data elements from the linked I/O device;
wherein each driver is executable to assign a single timestamp and a single quality value to the set of data elements received from the linked I/O device;
wherein the memory stores a real-time server, wherein the real-time server receives a plurality of blocks from at least one driver, wherein each block comprises the set of data elements, the single timestamp, and the single quality value;
wherein the memory stores a server process, wherein the server process comprises one or more drivers and the real-time server;
one or more client computer systems;
wherein the real-time server is executable to generate a packet, wherein the packet comprises one or more blocks received from one or more drivers;
wherein the real-time server provides the packet to one or more client computer systems in the industrial automation system;
wherein the server process is executable to provide to one or more clients a plurality of packets, wherein each packet comprises one or more blocks, wherein the plurality of packets comprises a first block of data elements and a second block of data elements, wherein the first block and the second block share a time/quality identification value, wherein the second block is provided to the clients after the first block;
wherein the server process is executable to determine which of the data elements of the second block are different from their counterparts in the first block;
wherein the server process is executable to determine whether the timestamp for the second block is different from its counterpart in the first block;
wherein the server process is executable to determine whether the quality value for the second block is different from its counterpart in the first block; and
wherein the server process is executable to provide as the second block to the clients only the time/quality identification value, those data elements which have changed, the timestamp if changed, and the quality value if changed.

61. A method for transferring real-time data in an industrial automation system comprising:
a hardware device generating a first plurality of data elements and a second plurality of data elements;
receiving each of the first plurality of data elements and the second plurality of data elements;
assigning at least one of the following:
a first timestamp to the first plurality of data elements; and a first quality value to the first plurality of data elements;

assigning at least one of the following:
  a second timestamp to the second plurality of data elements; and
  a second quality value to the second plurality of data elements;

wherein the first plurality of data elements and at least one of the first timestamp and the first quality value compose a first block of data elements;

wherein the second plurality of data elements and at least one of the second timestamp and the second quality value compose a second block of data elements;

a server process determining which of the data elements of the second block are different from their counterparts in the first block;

the server process determining whether the second timestamp, if present, for the second block is different from the first timestamp for the first block;

the server process determining whether the second quality value, if present, for the second block is different from the first quality value for the first block; and the server process providing the first block of data elements and the second block of data elements to the one or more clients, wherein the first block and the second block are generated by the same hardware device, wherein the second block is provided to the clients after the first block, wherein the server process providing the second block to one or more clients comprises the server process providing as the second block only those second plurality of data elements which have changed, and at least one of the second timestamp if changed and the second quality value if changed.

62. A method for transferring real-time data in an industrial automation system comprising:

a hardware device generating a block of data elements, wherein the block comprises a plurality of data elements;

receiving the block of data elements;

assigning at least one of the following:
  a single timestamp to the block of data elements; and
  a single quality value to the block of data elements;

a server process providing the block to one or more clients, wherein the block includes a plurality of data elements, and at least one of the single timestamp and the single quality value;

registering one or more time/quality groups with the server process, wherein each time/quality group defines a set of associated data elements which share at least one of the single timestamp and the single quality value;

the server process creating one or more time/quality identification values, wherein each time/quality identification value identifies a particular time/quality group;

the server process storing the time/quality identification values as references to the time/quality groups;

one or more clients storing the time/quality identification values as references to the time/quality groups.

63. The method of claim 62, further comprising:

the server process providing to one or more clients a first block of data elements and a second block of data elements, wherein the first block and the second block share a time/quality identification value, wherein the second block is provided to the clients after the first block;

the server process determining which of the data elements of the second block are different from their counterparts in the first block;

the server process determining at least one of the following:
  whether the timestamp for the second block is different from its counterpart in the first block;
  whether the quality value for the second block is different from its counterpart in the first block;

wherein the server process providing the second block to one or more clients further comprises the server process providing as the block only the time/quality identification value, those data elements which have changed, and at least one of the timestamp if changed and the quality value if changed.

64. A method for transferring real-time data in an industrial automation system comprising:

a hardware device generating a first plurality of data elements and a second plurality of data elements;

receiving each of the first plurality of data elements and the second plurality of data elements;

assigning at least one of the following:
  a first timestamp to the first plurality of data elements; and
  a first quality value to the first plurality of data elements;

assigning at least one of the following:
  a second timestamp to the second plurality of data elements; and
  a second quality value to the second plurality of data elements;

wherein the first plurality of data elements and at least one of the first timestamp and the first quality value compose a first block of data elements;

wherein the second plurality of data elements and at least one of the second timestamp and the second quality value compose a second block of data elements;

a server process providing each of the first block of data elements and the second block of data elements to one or more clients;

the server process determining which of the data elements of the second block are different from their counterparts in the first block;

the server process determining at least one of the following:
  whether the second timestamp for the second block is different from the first timestamp for the first block; and
  whether the second quality value for the second block is different from the first quality value for the first block; and the server process providing to one or more clients a plurality of packets, wherein each packet comprises one or more blocks, wherein the plurality of packets comprises the first block of data elements and the second block of data elements, wherein the first block and the second block share a time/quality identification value, wherein the second block is provided to the clients after the first block;

wherein the server process providing the packets to one or more clients further comprises the server process providing as the second block only the time/quality identification value, those second plurality of data elements which have changed, and at least one of the second timestamp if changed and the second quality value if changed.

65. An industrial automation system, comprising:

one or more I/O devices, wherein each I/O device generates a plurality of data elements;

a server computer system coupled to at least one of the I/O devices, wherein the server computer system includes a central processing unit (CPU), a display screen, memory, and one or more input devices;

wherein the memory stores one or more drivers, wherein each driver is linked to at least one I/O device and receives a set of data elements from the linked I/O device;

wherein each driver is executable to assign at least one of a single timestamp and a single quality value to the set of data elements received from the linked I/O device;

wherein the memory stores a real-time server, wherein the real-time server receives a plurality of blocks from at least one driver, wherein each block comprises the set of data elements, and at least one of the single timestamp and the single quality value;

wherein the memory stores a server process, wherein the server process comprises one or more drivers and the real-time server;

one or more client computer systems, wherein each client computer system receives a plurality of blocks from the real-time server;

wherein the server process is executable to provide to the one or more client computer systems a first block of data elements and a second block of data elements, wherein the first block and the second block are generated by the same I/O device, wherein the second block is provided to the client computer systems after the first block;

wherein the server process is executable to determine which of the data elements of the second block are different from their counterparts in the first block;

wherein the server process is executable to determine at least one of the following:
 whether the timestamp for the second block is different from its counterpart in the first block; and
 whether the quality value for the second block is different from its counterpart in the first block;

wherein the real-time server is executable to provide to the one or more client computer systems a plurality of blocks, wherein each block comprises only those data elements which have changed, and at least one of the timestamp if changed and the quality value if changed.

66. An industrial automation system, comprising:

one or more I/O devices, wherein each I/O device generates a plurality of data elements;

a server computer system coupled to at least one of the I/O devices, wherein the server computer system includes a central processing unit (CPU), a display screen, memory, and one or more input devices;

wherein the memory stores one or more drivers, wherein each driver is linked to at least one I/O device and receives a set of data elements from the linked I/O device;

wherein each driver is executable to assign at least one of a single timestamp and a single quality value to the set of data elements received from the linked I/O device;

wherein the memory stores a real-time server, wherein the real-time server receives a plurality of blocks from at least one driver, wherein each block comprises the set of data elements, and at least one of the single timestamp and the single quality value;

wherein the memory stores a server process, wherein the server process comprises one or more drivers and the real-time server;

one or more client computer systems, wherein each client computer system receives a plurality of blocks from the real-time server;

wherein the server process is executable to register one or more time/quality groups, wherein each time/quality group defines a set of associated data elements which share at least one of the single timestamp and the single quality value;

wherein the server process is executable to create one or more time/quality identification values, wherein each time/quality identification value identifies a particular time/quality group;

wherein the server process stores the time/quality identification values as references to the time/quality groups;

wherein the one or more client computer systems store the time/quality identification values as references to the time/quality groups.

67. An industrial automation system, comprising:

one or more I/O devices, wherein each I/O device generates a plurality of data elements;

a server computer system coupled to at least one of the I/O devices, wherein the server computer system includes a central processing unit (CPU), a display screen, memory, and one or more input devices;

wherein the memory stores one or more drivers, wherein each driver is linked to at least one I/O device and receives a set of data elements from the linked I/O device;

wherein each driver is executable to assign at least one of a single timestamp and a single quality value to the set of data elements received from the linked I/O device;

wherein the memory stores a real-time server, wherein the real-time server receives a plurality of blocks from at least one driver, wherein each block comprises the set of data elements and at least one of the single timestamp and the single quality value;

wherein the memory stores a server process, wherein the server process comprises one or more drivers and the real-time server;

one or more client computer systems, wherein each client computer system receives a plurality of blocks from the real-time server;

wherein the real-time server is executable to generate a packet, wherein the packet comprises one or more blocks received from one or more drivers;

wherein the real-time server provides the packet to one or more client computer systems in the industrial automation system;

wherein the server process is executable to provide to one or more clients a plurality of packets, wherein each packet comprises one or more blocks, wherein the plurality of packets comprises a first block of data elements and a second block of data elements, wherein the first block and the second block share a time/quality identification value, wherein the second block is provided to the clients after the first block;

wherein the server process is executable to determine which of the data elements of the second block are different from their counterparts in the first block;

wherein the server process is executable to determine at least one of:

whether the timestamp for the second block is different from its counterpart in the first block; and whether the quality value for the second block is different from its counterpart in the first block;

wherein the server process is executable to provide as the second block to the clients only the time/quality identification value, those data elements which have changed, and at least one of the timestamp if changed and the quality value if changed.

* * * * *